(12) United States Patent
Cho

(10) Patent No.: US 7,450,118 B2
(45) Date of Patent: Nov. 11, 2008

(54) METHOD FOR DISPLAYING THREE-DIMENSIONAL POLYGON ON SCREEN

(75) Inventor: Hang Shin Cho, Seongnam-Si (KR)

(73) Assignee: LG Electronics Inc., Seoul (KR)

( * ) Notice: Subject to any disclaimer, the term of this patent is extended or adjusted under 35 U.S.C. 154(b) by 555 days.

(21) Appl. No.: 10/978,048

(22) Filed: Oct. 29, 2004

(65) Prior Publication Data

US 2005/0099415 A1 May 12, 2005

(30) Foreign Application Priority Data

Nov. 8, 2003 (KR) .................... 10-2003-0078870

(51) Int. Cl.
*G06T 15/00* (2006.01)

(52) U.S. Cl. .................. 345/419; 345/422; 345/423; 345/426; 345/427; 345/589; 701/208; 701/212; 348/118

(58) Field of Classification Search ............... 345/419, 345/422, 423, 426, 427, 589
See application file for complete search history.

(56) References Cited

U.S. PATENT DOCUMENTS 6,175,802 B1 * 1/2001 Okude et al. ............ 701/208

2003/0128203 A1 * 7/2003 Marshall et al. ............ 345/419
2005/0052462 A1 * 3/2005 Sakamoto et al. .......... 345/473

* cited by examiner

*Primary Examiner*—Kimbinh T Nguyen
(74) *Attorney, Agent, or Firm*—Lee, Hong, Degerman, Kang & Waimey

(57) ABSTRACT

Three-dimensional models with three-dimensional coordinates for a certain area to be displayed on the screen based on coordinates of a reference position are received. The received three-dimensional models are classified according to the positions of nodes of polygons for the three-dimensional models. As for the three-dimensional models of which the nodes of the polygons exist on the same plane, they are displayed on the screen through automatic triangulation using a general three-dimensional graphic library. As for the three-dimensional models of which the nodes of the polygons do not exist on the same plane, they are displayed on the screen by converting the three-dimensional coordinates of the nodes of the polygons into three-dimensional coordinates based on a view point, converting the converted three-dimensional coordinates into two-dimensional coordinates through projection conversion onto a projection plane, and converting the two-dimensional coordinates into screen coordinates.

22 Claims, 7 Drawing Sheets

METHOD FOR DISPLAYING THREE-DIMENSIONAL POLYGON ON SCREEN

CROSS-REFERENCE TO RELATED APPLICATIONS

Pursuant to 35 U.S.C. § 119(a), this application claims the benefit of earlier filing date and right of priority to Korean Application No. 2003-0078870, filed on Nov. 8, 2003, the contents of which are hereby incorporated by reference herein in their entirety.

BACKGROUND OF THE INVENTION

1. Field of the Invention

The present invention relates to a method for displaying a three-dimensional polygon on a screen, wherein a three-dimensional polygon that is geometrically incomplete and thus cannot be displayed on the screen by means of automatic triangulation in a general three-dimensional graphic library can be displayed on the screen. More particularly, the present invention relates to a method for displaying a three-dimensional polygon on a screen, wherein two-dimensional coordinates of vertexes obtained by projecting vertexes of the three-dimensional polygon onto a two-dimensional plane are connected to reconstitute the three-dimensional polygon.

2. Description of the Related Art

There is a recent tendency toward three-dimensional display in a variety of industrial fields including navigation systems for guiding travel paths of vehicles and three-dimensional games. However, in practice, the three-dimensional display is slowly propagated to applicable fields in the entire society due to difficulties in performing three-dimensional modeling operations. This is because it is difficult to apply conventional methods used in many applicable fields, i.e. simple expansion of two-dimensional coordinate data used for two-dimensional display to three-dimensional coordinate data, directly to three-dimensional display. This results from the following limitations on requirements for three-dimensional polygons that can be processed in a general three-dimensional graphic library widely used at present.

First, sides of a three-dimensional polygon should not intersect with each other contrary to that shown in FIG. 1a. That is, the conventional methods support only a simple polygon without an intersection 100.

Second, it is impossible to output a concave polygon with a recessed portion 110 as shown in FIG. 1b, whereas it is possible to output only a convex polygon with outwardly protruding vertexes.

Third, it is impossible to output a polygon with an inner hole 120 as shown in FIG. 1c.

The reason why there are such limitations on the general three-dimensional graphic library is that, in order to prevent the presence of a polygon with a twisted structure, a list of vertexes of a three-dimensional polygon is subjected to automatic triangulation to reconstitute it into a shape comprising triangles with complete geometric structures in space. For example, if a mesh with a twisted structure as shown in FIG. 2a is subjected to automatic triangulation in a general three-dimensional graphic library, it is caused to be reconstituted into a shape shown in FIG. 2b or 2c.

FIG. 3a shows errors in automatic triangulation in a general three-dimensional graphic library. It can be understood from FIG. 3 that although an "S"-shaped mesh is intended to be displayed, desired results are not obtained due to the output made by means of automatic triangulation through comparison of all lists of vertexes with one another in a general three-dimensional graphic library.

In this case, the errors are solved by means of a method for finely dividing the mesh as shown in FIG. 3b and performing an input operation again. However, the method for finely dividing a mesh can be hardly used for practical applications since an operator should manually find out a twisted portion in a geometric structure one by one.

FIGS. 4a and 4b are views illustrating results output through automatic triangulation in a general three-dimensional graphic library after simple expansion of map data with two-dimensional coordinates to map data with three-dimensional coordinates in a navigation system. FIG. 4a shows a map obtained by displaying map data with two-dimensional coordinates on a screen, i.e. a map of 'Han River' and its peripheral regions. The map data with two-dimensional coordinates were simply expanded to map data with three-dimensional coordinates in the form of (x, y, 0) and then displayed on the screen using a general three-dimensional graphic library. As a result, critical errors occurred in automatic triangulation as shown in FIG. 4b.

That is, it can be seen that the critical errors in the automatic triangulation severely occurred at 'Han River' and its tributaries such as 'Anyangcheon(Stream)' and 'Tancheon (Stream),' and the like. Since the automatic triangulation is performed to prevent the presence of a twisted structure in space, it is desirable not to perform the automatic triangulation using a general three-dimensional graphic library in case of a map and the like in which all data exist on a single plane.

SUMMARY OF THE INVENTION

An object of the present invention is to provide a method for displaying a three-dimensional polygon on a screen, wherein geometrically incomplete, three-dimensional polygons such as polygons with intersecting sides, concave polygons or polygons with inner holes, which cannot be processed in a general three-dimensional graphic library, can be accurately displayed on the screen.

Another object of the present invention is to provide a method for displaying a three-dimensional polygon on a screen, wherein data with two-dimensional coordinates used in many applicable fields can be utilized simply by expanding them to data with three-dimensional coordinates.

A further object of the present invention is to provide a method for displaying a three-dimensional polygon on a screen, wherein some processes that are not inevitably required for three-dimensional graphic processing can be eliminated, thereby reducing the amount of calculation in a general three-dimensional graphic library and improving efficiency of processing time.

In the method for displaying a three-dimensional polygon on a screen according to the present invention for achieving the objects, the following steps are performed: a general three-dimensional coordinate conversion step, and a series of steps of projecting data with three-dimensional coordinates onto a two-dimensional projection plane through coordinate projection conversion, and connecting vertexes projected onto the two-dimensional projection plane to one another.

According to a first feature of the present invention, data on three-dimensional models with three-dimensional coordinates are used as input. In case of application to navigation systems, map data with two-dimensional coordinates are modeled into map data with three-dimensional coordinates to be used. In case of application to games or the like, data on models with three-dimensional coordinates from a storage means or the like are directly input and used.

According to a second feature of the present invention, the input models with three-dimensional coordinates in the first feature are classified into models with three-dimensional coordinates of which all nodes constituting polygons exist on the same plane, and other models with three-dimensional coordinates of which all nodes constituting polygons do not exist on the same plane.

According to a third feature of the present invention, in case of the models with three-dimensional coordinates of which all nodes constituting polygons exist on the same plane in the second feature, the nodes constituting the polygons for the models with three-dimensional coordinates are projected, and projected two-dimensional points onto a two-dimensional plane are then connected to one another to reconstitute polygons. Accordingly, even geometrically incomplete, three-dimensional polygons such as polygons with intersections, concave polygons or polygons with inner holes can be output and displayed on a screen while their shapes are maintained as they are. Further, during general three-dimensional graphic processing, it is possible to eliminate calculation processes such as automatic triangulation of the input models and comparison between polygons in view of overlapped and hidden faces.

According to a fourth feature of the present invention, nodes of the polygons existing outside the screen after the projection onto the projection plane in the process of reconstituting the two-dimensional polygons in the third feature are removed. If the polygons are partially truncated by edges of the screen, new output polygons are reconstituted using sides of the edges of the screen at the truncated portions.

According to a fifth feature of the present invention, in case of the models of which the nodes constituting the polygons do not exist on the same plane in the second feature, they are processed using the general three-dimensional graphic library and then displayed on the screen.

According to a sixth feature of the present invention, in case of displaying output results obtained in the third and fifth features on the screen, the results can be overlapped with one another in a proper order through transparent operations and then output in an integrated form.

According to a seventh feature of the present invention, the displaying method of the present invention enables a great deal of data with two-dimensional coordinates such as map data with two-dimensional coordinates or CAD drawings, which have not yet been used through expansion thereof to those with three-dimensional coordinates, to be used through automatic constitution into data with three-dimensional coordinates.

According to an aspect of the present invention, there is provided a method for displaying a three-dimensional polygon on a screen, comprising a three-dimensional model input step of receiving three-dimensional models with three-dimensional coordinates for an area to be displayed on the screen based on coordinates of a reference position; a polygon reconstituting step of classifying the three-dimensional models input in the three-dimensional model input step according to the positions of nodes of polygons for the three-dimensional models, and reconstituting polygons for the classified models; and a screen displaying step of displaying the polygons reconstituted in the polygon reconstituting step on the screen.

According to another aspect of the present invention, there is provided a method for displaying a three-dimensional polygon on a screen, comprising a three-dimensional environment initializing step of initializing three-dimensional display environments, a view point setting step of setting a view point and a sight line based on coordinates of a reference position after the three-dimensional environment initializing step; a projection parameter setting step of setting projection parameters after the view point setting step; a three-dimensional model input step of receiving three-dimensional models with three-dimensional coordinates for an area based on the coordinates of the reference position; a polygon reconstituting step of classifying the three-dimensional models input in the three-dimensional model input step according to the positions of nodes of polygons for the three-dimensional models, and converting coordinates of the nodes using values set in the three-dimensional environment initializing step, the view point setting step and the projection parameter setting step into coordinates to reconstitute polygons for the classified models; and a screen displaying step of displaying the polygons reconstituted in the polygon reconstituting step on the screen.

According to a further aspect of the present invention, there is provided a method for displaying a three-dimensional polygon on a screen, comprising a three-dimensional environment initializing step of initializing three-dimensional display environments; a view point setting step of setting a view point and a sight line based on coordinates of a reference position after the three-dimensional environment initializing step; a projection parameter setting step of setting projection parameters after the view point setting step; a three-dimensional modeling step of modeling a three-dimensional map by loading map data with two-dimensional coordinates corresponding to an area to be displayed in the three-dimensional map on the screen based on the coordinates of the reference position; a polygon reconstituting step of classifying three-dimensional models modeled in the three-dimensional modeling step according to the positions of nodes of polygons for the three-dimensional models, and converting coordinates of the nodes using values set in the three-dimensional environment initializing step, the view point setting step and the projection parameter setting step into coordinates to reconstitute polygons for the classified models; and a screen displaying step of displaying the polygons reconstituted in the polygon reconstituting step on the screen.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Hereinafter, a method for displaying a three-dimensional polygon on a screen according to the present invention will be described in detail with reference to the accompanying drawings, especially FIGS. 5, 6a and 6b.

Figure 1A:
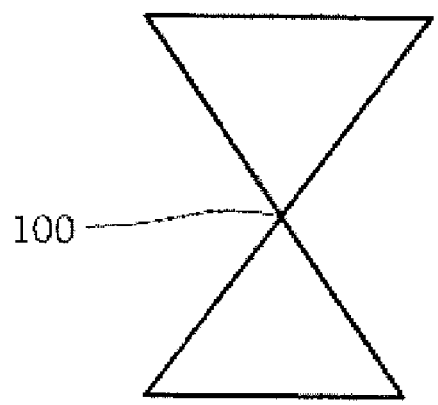
FIGS. 1a to 1c are exemplary diagrams showing three-dimensional polygons that cannot be processed in a general three-dimensional graphic library.
Figure 1B:
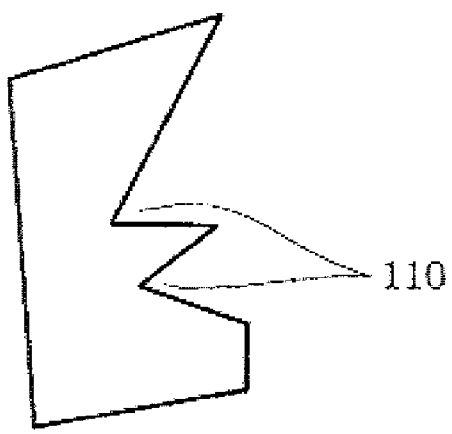
Figure 1C:
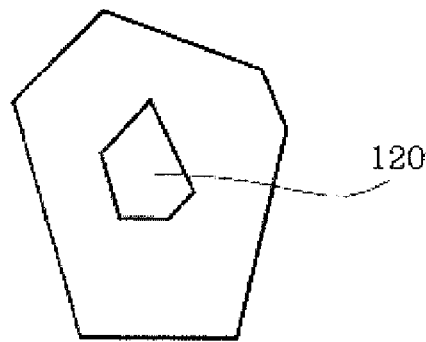
Figure 2A:
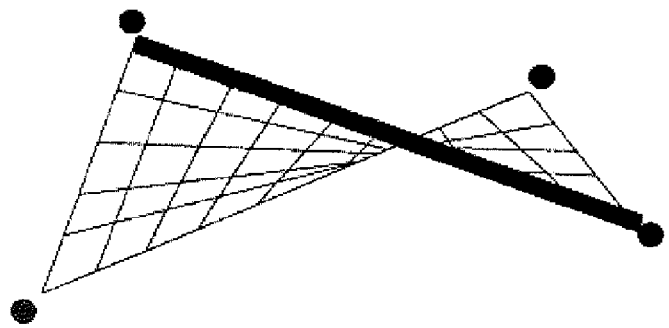
FIGS. 2a to 2c are exemplary diagrams illustrating conversion of a polygon twisted in space into a complete structure through automatic triangulation in the general three-dimensional graphic library.
Figure 2B:
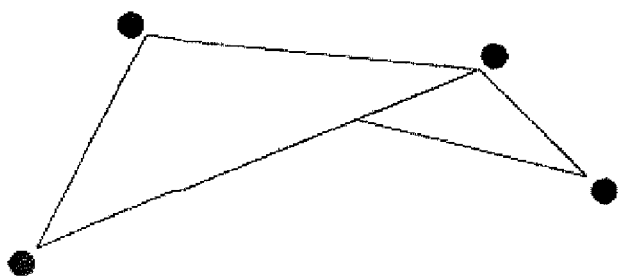
Figure 2C:
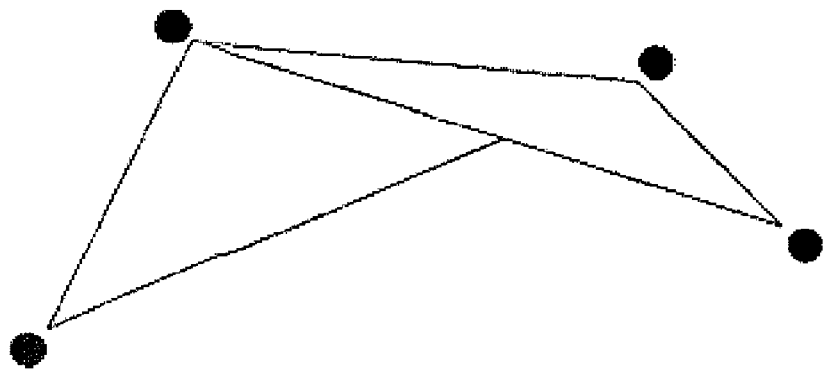
Figure 3A:
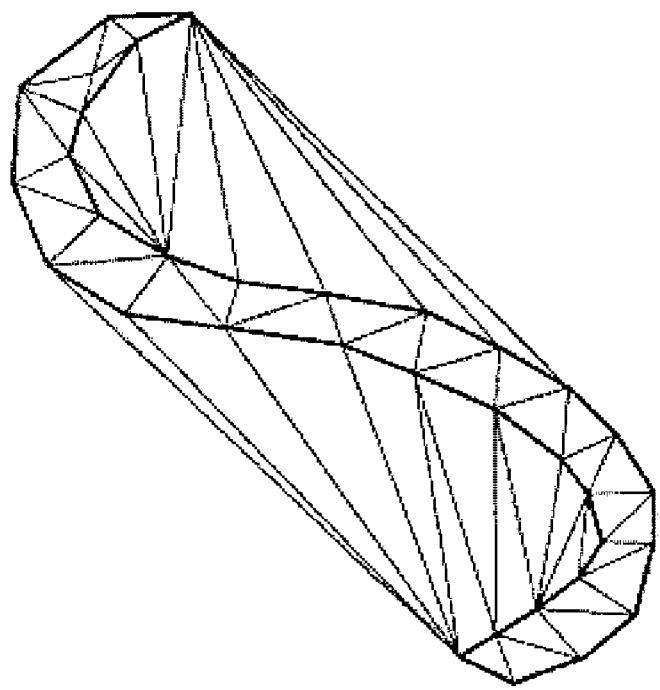
FIGS. 3a and 3b are diagrams illustrating errors in automatic triangulation in the general three-dimensional graphic library, and output results of manual division for a mesh.
Figure 3B:
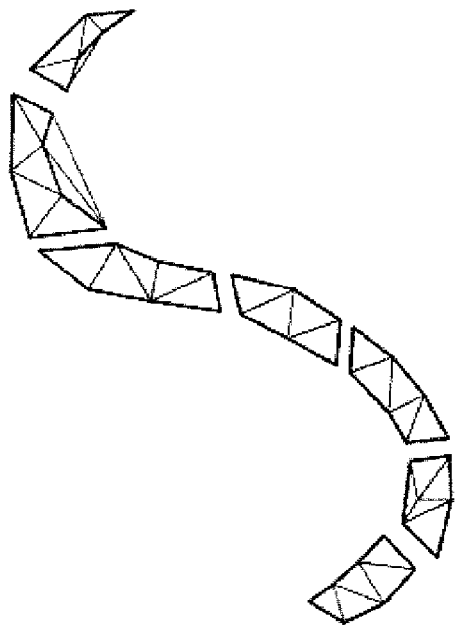
Figure 4A:
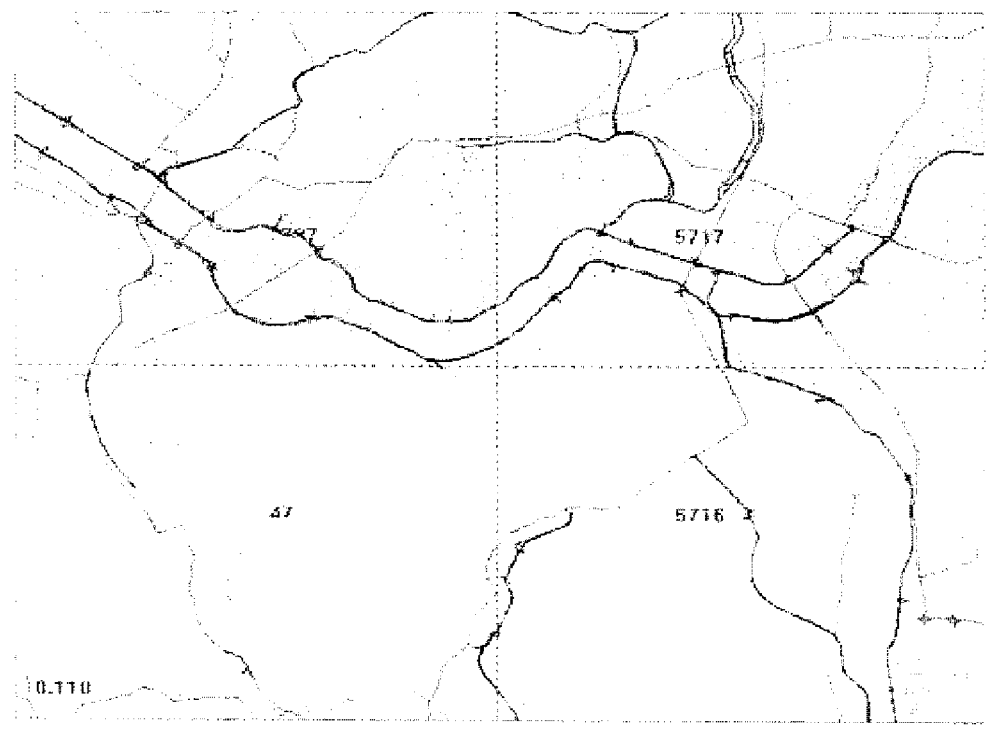
FIGS. 4a and 4b are views showing results obtained by simply expanding map data with two-dimensional coordinates to map data with three-dimensional coordinates and outputting the map data with three-dimensional coordinates using the general three-dimensional graphic library, in order to illustrate errors in automatic triangulation.
Figure 4B:
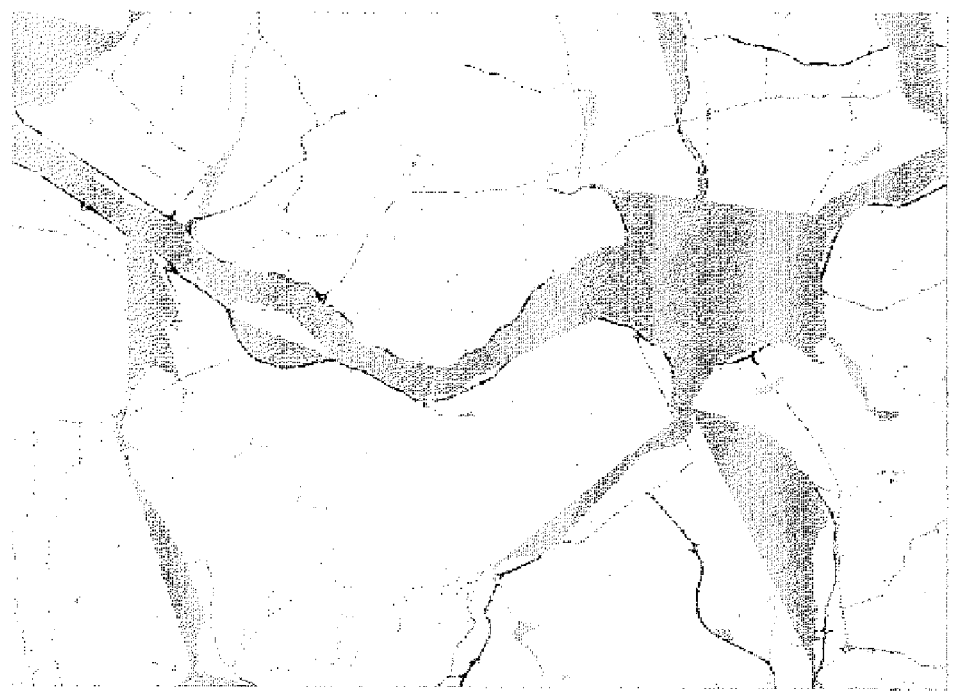
Figure 5:
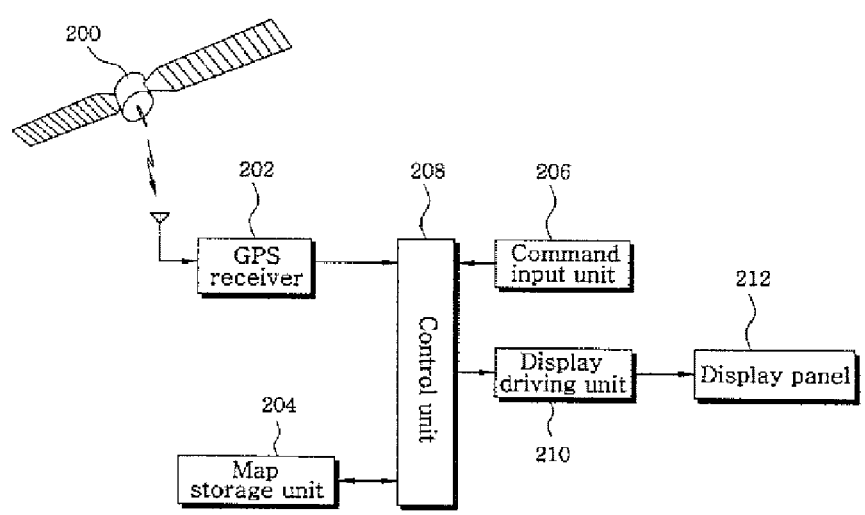
FIG. 5 is a block diagram exemplarily showing a configuration of a navigation system to which a method for displaying a three-dimensional polygon on a screen according to the present invention is applied.

FIG. 5 is a block diagram exemplarily showing a configuration of a navigation system to which the method for displaying a three-dimensional polygon on a screen according to the present invention is applied. As shown in the figure, the navigation system comprises a GPS (global positioning system) receiver 202 for receiving navigation messages transmitted by a plurality of GPS satellites 200; a map storage unit 204 for beforehand storing map data with two-dimensional coordinates therein; a command input unit 206 for receiving operation commands according to user's manipulation; a control unit 208 capable of controlling operations for determining a current vehicle location from the navigation messages received by the GPS receiver 202, for reading out map data with two-dimensional coordinates for a certain area from the map storage unit 204 based on the determined current vehicle location, for generating map data with three-dimensional coordinates from the read map data with two dimensional coordinates and for displaying them so as to guide a travel path of the vehicle; and a display driving unit 210 for causing the current vehicle location and the travel path together with a three-dimensional map to be displayed on a display panel 212 under the control of the control unit 208.

The GPS receiver 202 of the navigation system constructed as above receives the navigation messages respectively transmitted by the plurality of GPS satellites 200 and inputs them into the control unit 208.

When a vehicle travels, the control unit 208 determines the current vehicle location using the navigation messages received by and input from the GPS receiver 202 and reads out map data with two-dimensional coordinates for a certain area from the map storage unit 204 based on the determined current vehicle location. Then, the control unit 208 generates map data with three-dimensional coordinates from the read map data with two-dimensional coordinates by means of the displaying method of the present invention. The control unit 208 outputs the generated map data with three-dimensional coordinates to the display driving unit 210 so that a three-dimensional map can be displayed on the display panel 212. At this time, the determined current vehicle location is simultaneously displayed in the form of an arrow or the like in the three-dimensional map to guide the travel of the vehicle.

Here, the navigation system has been described by way of example as being fixedly installed at the vehicle. On the contrary, in a case where such a navigation system is installed in a mobile apparatus, there is a limitation on the storage capacity of the map storage unit 204. Accordingly, in response to commands from the command input unit 206, connection may be made to a map-providing server to download map data with two-dimensional coordinates for a certain area, for example, the entire area of Seoul City, and the downloaded map data with two-dimensional coordinates may be stored in the map storage unit 204 and then used.

Figure 6A:
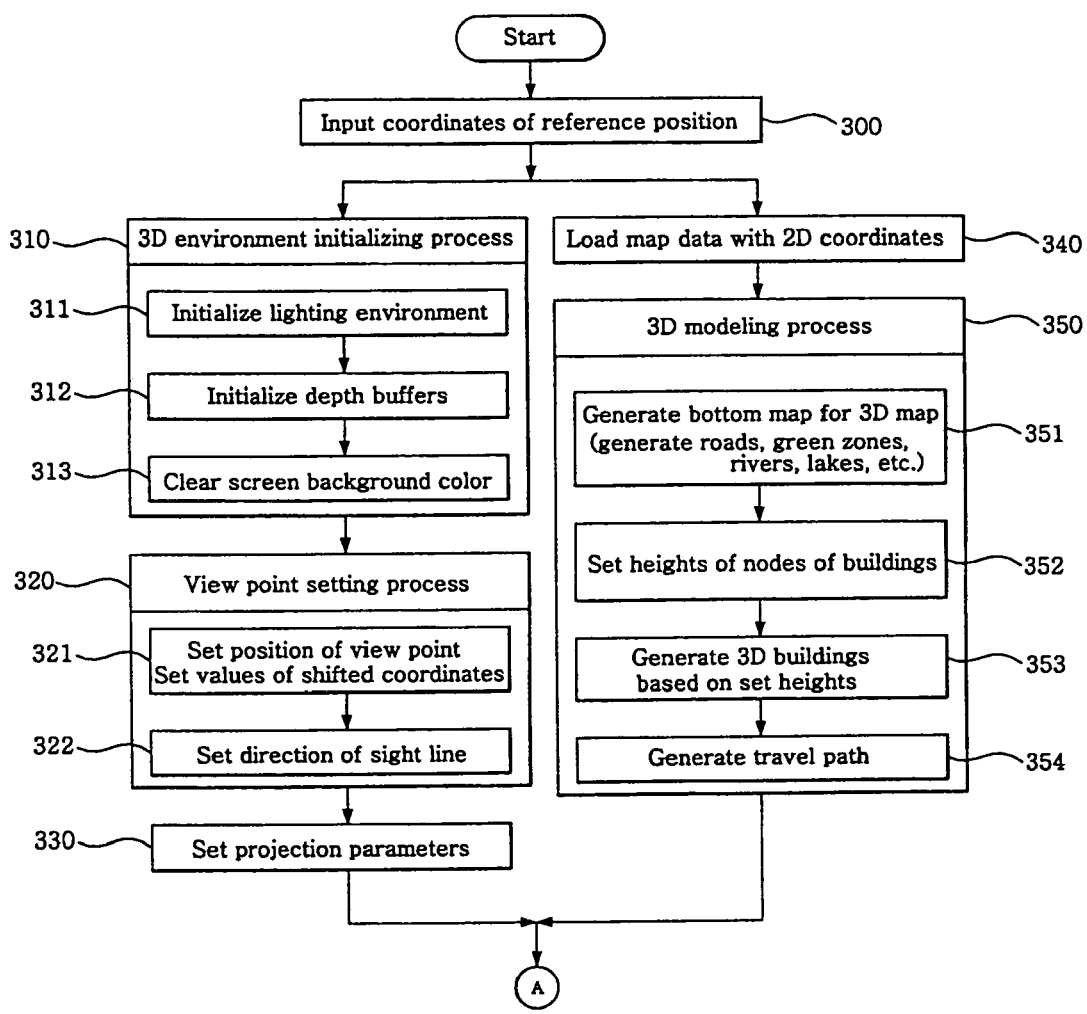
FIGS. 6a and 6b are flowcharts illustrating an embodiment of the method for displaying a three-dimensional polygon on a screen according to the present invention.
Figure 6B:
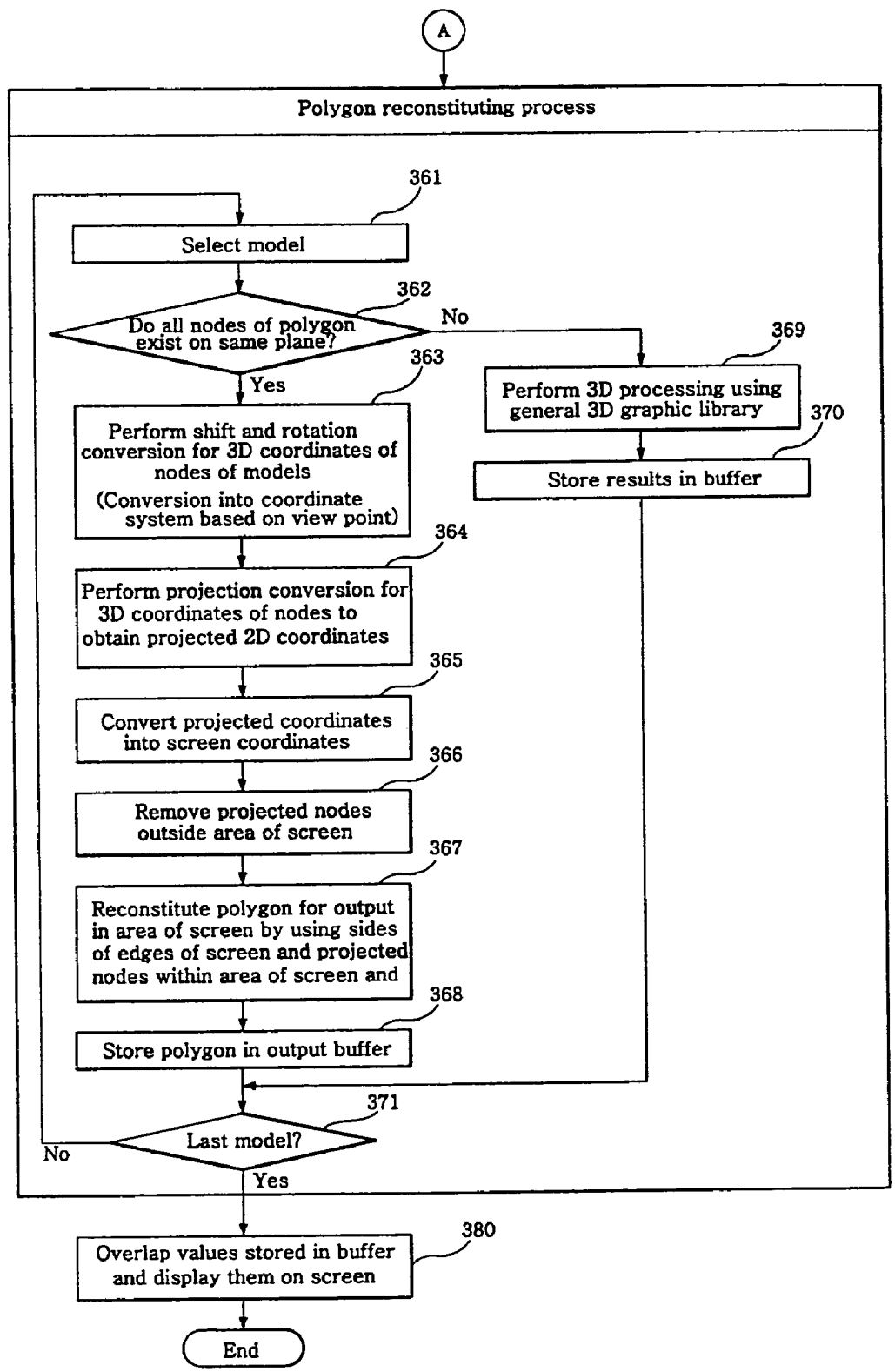

FIGS. 6a and 6b are flowcharts illustrating an embodiment of the method for displaying a three-dimensional polygon on a screen according to the present invention. As shown in the figures, the control unit 208 sets coordinates of a reference position for use in generating map data with three-dimensional coordinates (step 300). Here, as for the coordinates of the reference position in step 300, coordinates of a current vehicle location that the control unit 208 detects from navigation messages received by the GPS receiver 202, or coordinates of a position input through the command input unit 206 by a user may be set as the coordinates of the reference position.

When the coordinates of the reference position has been completely input, the control unit 208 performs the process of initializing three-dimensional environments for displaying a three-dimensional map or three-dimensional models on the display panel 212 (step 310). The process of initializing the three-dimensional environments performed in step 310 comprises the following steps. A lighting environment is initialized (step 311). The initialization of the lighting environment in step 311 sets a view point, a sight line, the direction of a light source, the intensity of the light source, colors and their depths for indicating respective sides of buildings according to the angles of the respective sides of the buildings, and the like. Then, depth buffers are initialized (step 312). That is, the depth buffers for indicating distances from the view point to positions where certain objects will be displayed are initialized. Then, a background color of a screen of the display panel is cleared and set to a predetermined color (step 313).

When the process of initializing the three-dimensional environments is completed in step 310, the control unit 208 performs the process of setting a view point (step 320). The process of setting the view point in step 320 comprises the following steps. First, the position of the view point is set (step 321). As for the setting of the position of the view point, for example, coordinates of a position elevated by a predetermined height at the set coordinates of the reference position are set as the view point.

In step 322, a sight line that refers to a direction in which a three-dimensional map or model is viewed from the set position of the view point is then set. For example, a travel direction of the vehicle is set as the sight line.

When the process of setting the view point is completed in step 320, projection parameters for use in projection conversion in which map data with three-dimensional coordinates will be projected on a projection plane are set (step 330).

While the control unit 208 sequentially performs the three-dimensional environment initializing process in step 310, the view point setting process in step 320 and the projection parameter setting process in step 330, the control unit loads map data with two-dimensional coordinates for a certain area from the map storage unit 204 based on the coordinates of the reference position (step 340), and performs a three-dimensional modeling process of modeling the loaded map data with two-dimensional coordinates into map data with three-dimensional coordinates (step 350).

The three-dimensional modeling process in step 350 comprises the following steps. A bottom map for a three-dimensional map with three-dimensional coordinates is generated from the map data with two-dimensional coordinates, for example, lines for roads, green zones, rivers, lakes and the like are set (step 351). The heights of nodes of respective buildings are set (step 352). The respective buildings having the set heights are generated (step 353), and the travel path of the vehicle is then generated using arrows or dotted lines (step 354).

Here, the process of loading the map data with two-dimensional coordinates in step 340 and the three-dimensional modeling process in step 350 have been described by way of example in connection with a case where a three-dimensional map is displayed on a screen of a navigation system. However, as for games or the like in which three-dimensional images are displayed, since models with three-dimensional coordinates have been previously stored in a storage means, the models with three-dimensional coordinates of a certain area based on coordinates of a reference position can be loaded directly from the storage means without performing the process of loading the map data with two-dimensional coordinates in step 340 and the three-dimensional modeling process in step 350.

In step 360, a polygon reconstituting process of reconstituting polygons for the models with three-dimensional coordinates that have been modeled in the three-dimensional modeling process, or the models with three-dimensional coordinates that have been loaded from the storage means is performed. The polygon reconstituting process in step 360 comprises the following steps. One model is selected (step 361), and it is determined whether all nodes constituting a polygon for the selected model are those existing on the same plane (step 362).

If it is determined in step 362 that all the nodes constituting the polygon for the selected model are those existing on the same plane, three-dimensional coordinates of the respective nodes of the three-dimensional model are converted into those in a three-dimensional coordinate system with an origin defined by the view point by means of shift and rotation thereof along the view point and the sight line (step 363). The respective nodes converted into those in the three-dimensional coordinate system with the origin defined by the view point are subjected to projection conversion onto a projection plane to obtain values of the projected two-dimensional coordinates (step 364).

Since the values of the projected two-dimensional coordinates may be negative numbers or real numbers, they are converted into screen coordinates for the display on the display panel 212 by performing proper scale and position adjustment on a two-dimensional plane (step 365).

All projected nodes existing outside the screen area of the display panel 212 are removed (step 366), and a portion of the polygon that exists over edges of the screen and thus is truncated is replaced with sides of the edges of the screen to reconstitute a new polygon (step 367). The new polygon is stored in a buffer (step 368).

If it is determined in step 362 that the nodes constituting the polygon for the selected model do not exist on the same plane, the polygon for the selected model is subjected to three-dimensional processing using a general three-dimensional graphic library (step 369), and the processing results are stored in the buffer (step 370).

After such processing has been performed according to whether the nodes of the polygon for the selected model exist on the same plane, it is determined whether processing up to the last model has been completed (step 371). If it is determined in step 371 that a model being processed is not the last model, the procedure returns to step 361 and then another model for which a polygon has not yet been reconstituted is selected. Thereafter, such processing operations that will be performed according to whether all nodes of the polygon exist on the same plane are repeatedly performed.

Further, if it is determined in step 371 that such polygon reconstitution model has been completed up to the last, the control unit 208 causes the values stored in the buffer in steps 368 and 370 to overlap with one another and outputs the results to the display driving unit 210 to be displayed on the display panel 212 (step 380).

According to the present invention described above, geometrically incomplete polygons such as polygons with intersecting sides, concave polygons or polygons with inner holes, which cannot be processed in a general three-dimensional graphic library, can be displayed in a three-dimensional manner on a screen. Further, data with two-dimensional coordinates widely used in many applicable fields can be easily expanded to data with three-dimensional coordinates to be displayed on the screen. In addition, some calculation processes that are not required for three-dimensional processing can be eliminated, thereby reducing the amount of calculation for the three-dimensional processing and improving efficiency of processing time.

Although the present invention has been illustrated and described in connection with the preferred embodiment, it will be readily understood by those skilled in the art that various adaptations and changes can be made thereto without departing from the spirit and scope of the present invention defined by the appended claims. That is, although the present invention has been described by way of example as being applied to a navigation system in which data on a two-dimensional digital map are modeled into data on a three-dimensional map and polygons are then reconstituted and displayed, it is not limited thereto. The present invention can be applied to a variety of fields including three-dimensional games.

What is claimed is:

1. A method for displaying a three-dimensional polygon on a screen, comprising:
    a three-dimensional environment initializing step of initializing three-dimensional display environments;
    a view point setting step of setting a view point and a sight line based on coordinates of a reference position after the three-dimensional environment initializing step;
    a projection parameter setting step of setting projection parameters after the view point setting step;
    a three-dimensional model input step of receiving three-dimensional models with three-dimensional coordinates for an area based on the coordinates of the reference position;
    a polygon reconstituting step of classifying the three-dimensional models input in the three-dimensional model input step according to the positions of nodes of polygons for the three-dimensional models, and converting coordinates of the nodes using values set in the three-dimensional environment initializing step, the view point setting step and the projection parameter setting step into coordinates to reconstitute polygons for the classified models; and
    a screen displaying step of displaying the polygons reconstituted in the polygon reconstituting step on the screen.

2. The method as claimed in claim 1, wherein the coordinates of the reference position are coordinates of a current vehicle location detected from signals received by a GPS receiver, or coordinates input by a user.

3. The method as claimed in claim 1, wherein the three-dimensional environment initializing step comprises the steps of:
    setting colors and their depths for use in displaying respective sides of buildings according to the view point, the sight line, the direction of a light source, the intensity of the light source, and angles of the respective sides of the buildings;
    initializing depth buffers for indicating distances from the view point to positions where objects to be displayed will be displayed; and
    setting a predetermined color as a background color of the screen.

4. The method as claimed in claim 1, wherein the view point setting step comprises the step of setting a position elevated by a predetermined height at the coordinates of the reference position as the view point, and setting the sight line at the set view point.

5. The method as claimed in claim 4, wherein the sight line is in a travel direction of a vehicle.

6. The method as claimed in claim 1, wherein the classification of the three-dimensional models in the polygon reconstituting step is performed by determining whether all nodes of a polygon for a three-dimensional model exist on the same plane.

7. The method as claimed in claim 1, wherein the polygon reconstituting step comprises the step of:
    if all nodes of a polygon for a three-dimensional model input in the three-dimensional model input step do not exist on the same plane, performing automatic triangulation through three-dimensional processing using a general three-dimensional graphic library.

8. The method as claimed in claim 1, wherein the polygon reconstituting step comprises:
    a view point coordinate converting step of, if all nodes of a polygon for a three-dimensional model exist on the same plane, converting three-dimensional coordinates of the nodes of the polygon for the three-dimensional model into three-dimensional coordinates based on the view point;
    a projection converting step of projection-converting the coordinates of the nodes of the polygon, which have been converted into the three-dimensional coordinates based on the view point in the view point coordinate converting step, into two-dimensional coordinates; and
    a screen coordinate converting step of converting the two-dimensional coordinates of the nodes of the polygon obtained in the projection converting step into screen coordinates.

9. The method as claimed in claim 8, after the screen coordinate converting step, further comprising:
    a polygon converting step of removing all nodes existing outside the area of the screen in view of the screen coordinates of the nodes of the polygon, and replacing a portion of a polygon, which exists over edges of the screen and thus is truncated, with sides of the edges of the screen.

10. A method for displaying a three-dimensional polygon on a screen, comprising:
    a three-dimensional environment initializing step of initializing three-dimensional display environments;
    a view point setting step of setting a view point and a sight line based on coordinates of a reference position after the three-dimensional environment initializing step;
    a projection parameter setting step of setting projection parameters after the view point setting step;
    a three-dimensional modeling step of modeling a three-dimensional map by loading map data with two-dimensional coordinates corresponding to an area to be displayed in the three-dimensional map on the screen based on the coordinates of the reference position;
    a polygon reconstituting step of classifying three-dimensional models modeled in the three-dimensional modeling step according to the positions of nodes of polygons for the three-dimensional models, and converting coordinates of the nodes using values set in the three-dimensional environment initializing step, the view point setting step and the projection parameter setting step into coordinates to reconstitute polygons for the classified models; and
    a screen displaying step of displaying the polygons reconstituted in the polygon reconstituting step on the screen.

11. The method as claimed in claim 10, wherein the coordinates of the reference position are coordinates of a current vehicle location detected from signals received by a GPS receiver, or coordinates input by a user.

12. The method as claimed in claim 10, wherein the three-dimensional environment initializing step comprises the steps of:
    setting colors and their depths for use in displaying respective sides of buildings according to the view point, the sight line, the direction of a light source, the intensity of the light source, and angles of the respective sides of the buildings;
    initializing depth buffers for indicating distances from the view point to positions where objects to be displayed will be displayed; and
    setting a predetermined color as a background color of the screen.

13. The method as claimed in claim 10, wherein the view point setting step comprises the step of setting the view point based on the coordinates of the reference position, and setting the sight line at the set view point.

14. The method as claimed in claim 10, wherein the three-dimensional modeling step comprises the steps of:
    generating a bottom map with three-dimensional coordinates from the loaded map data with two-dimensional coordinates;
    setting heights of nodes for respective buildings after the bottom map generating step, and generating buildings with the set heights; and
    generating a travel path of a vehicle after the building generating step.

15. The method as claimed in claim 10, wherein the classification of the three-dimensional models in the polygon reconstituting step is performed by determining whether all nodes of a polygon for a three-dimensional model exist on the same plane.

16. The method as claimed in claim 10, wherein the polygon reconstituting step comprises the step of:
    if all nodes of a polygon for a three-dimensional model input in the three-dimensional model input step do not exist on the same plane, performing automatic triangulation through three-dimensional processing using a general three-dimensional graphic library.

17. The method as claimed in claim 10, wherein the polygon reconstituting step comprises:
    a view point coordinate converting step of, if all nodes of a polygon for a three-dimensional model exist on the same plane, converting three-dimensional coordinates of the nodes of the polygon for the three-dimensional model into three-dimensional coordinates based on the view point;
    a projection converting step of projection-converting the coordinates of the nodes of the polygon, which have been converted into the three-dimensional coordinates based on the view point in the view point coordinate converting step, into two-dimensional coordinates; and
    a screen coordinate converting step of converting the two-dimensional coordinates of the nodes of the polygon obtained in the projection converting step into screen coordinates.

18. The method as claimed in claim 17, after the screen coordinate converting step, further comprising:
    a polygon converting step of removing all nodes existing outside the area of the screen in view of the screen coordinates of the nodes of the polygon, and replacing a portion of a polygon, which exists over edges of the screen and thus is truncated, with sides of the edges of the screen.

19. A navigation system for displaying a three-dimensional polygon on a display screen, the system comprising:
   a GPS (global positioning system) receiver for receiving navigation messages transmitted by a plurality of GPS satellites;
   a map storage unit for storing map data with two-dimensional coordinates;
   a command input unit for receiving operation commands;
   a control unit controlling operations for:
      initializing three-dimensional display environments;
      setting a view point and a sight line based on coordinates of a reference position;
      setting projection parameters;
      receiving three-dimensional models with three-dimensional coordinates for an area based on the coordinates of the reference position;
      classifying the three-dimensional models according to positions of nodes of polygons for the three-dimensional models; and
      converting coordinates of the nodes into coordinates to reconstitute polygons for the classified three-dimensional models using values set according to the projection parameters; and
   a display unit comprising a display screen for displaying the reconstituted polygons.

20. The system of claim 19, wherein the control unit further controls operations for:
   determining a current vehicle location from the navigation messages received by the GPS receiver;
   reading the map data with the two-dimensional coordinates for a certain area from the map storage unit based on the determined current vehicle location;
   generating map data with three-dimensional coordinates from the read map data with the two-dimensional coordinates; and
   displaying the generated map data with the three-dimensional coordinates to guide a travel path of the vehicle.

21. A navigation system for displaying a three-dimensional polygon on a display screen, the system comprising:
   a GPS (global positioning system) receiver for receiving navigation messages transmitted by a plurality of GPS satellites; a map storage unit for storing map data with two-dimensional coordinates
   a command input unit for receiving operation commands;
   a control unit controlling operations for:
   initializing three-dimensional display environments;
      setting a view point and a sight line based on coordinates of a reference position;
      setting projection parameters;
      modeling a three-dimensional map by loading map data with two- dimensional coordinates corresponding to an area to be displayed in the three- dimensional map on the screen based on the coordinates of the reference position;
      classifying the three-dimensional map according to positions of nodes of polygons for the three-dimensional map; and
      converting coordinates of the nodes into coordinates to reconstitute polygons for the classified three-dimensional map using values set according to the projection parameters; and
   a display unit comprising a display screen for displaying the reconstituted polygons.

22. The system of claim 21, wherein the control unit further controls operations for:
   determining a current vehicle location from the navigation messages received by the GPS receiver
   reading the map data with the two-dimensional coordinates for a certain area from the map storage unit based on the determined current vehicle location;
   generating map data with three-dimensional coordinates from the read map data with the two-dimensional coordinates; and
   displaying the generated map data with the three-dimensional coordinates to guide a travel path of the vehicle.

* * * * *